United States Patent [19]

Ochiumi

[11] Patent Number: 4,588,642
[45] Date of Patent: May 13, 1986

[54] THERMOPLASTIC FLUORINE-CONTAINING RESIN LAMINATE

[75] Inventor: Masahide Ochiumi, Yokkaichi, Japan

[73] Assignee: Mitsubishi Petrochemical Co., Ltd., Tokyo, Japan

[21] Appl. No.: 608,472

[22] Filed: May 9, 1984

[30] Foreign Application Priority Data

May 20, 1983 [JP] Japan .................................. 58-88964
Aug. 24, 1983 [JP] Japan .................................. 58-154283

[51] Int. Cl.$^4$ .............................................. B32B 27/08
[52] U.S. Cl. .................................... 428/421; 428/422; 428/520; 428/522
[58] Field of Search ............... 428/421, 422, 522, 520

[56] References Cited

U.S. PATENT DOCUMENTS

| | | | |
|---|---|---|---|
| 4,317,860 | 3/1982 | Strassel | 428/422 X |
| 4,317,861 | 3/1982 | Kidoh et al. | 428/421 |
| 4,444,826 | 4/1984 | Sasaki et al. | 428/520 X |
| 4,477,532 | 10/1984 | Schmukler et al. | 428/520 X |

*Primary Examiner*—Thomas J. Herbert
*Attorney, Agent, or Firm*—Robert E. Burns; Emmanuel J. Lobato; Bruce L. Adams

[57] ABSTRACT

A laminate comprising a layer of a modified resin selected from the group consisting of (a) a resinous modified ethylene or vinyl acetate polymer or a polymer composition thereof containing a specific proportion of the vinyl acetate and (b) a resinous modified ethylene or alkyl acrylate polymer or a polymer composition thereof containing a specific proportion of the alkyl acrylate, and a layer of a thermoplastic fluorine-containing resin is disclosed. The laminate exhibits a high interfacial adhesion strength, while maintaining the advantages of the fluorine-containing resin.

10 Claims, No Drawings

THERMOPLASTIC FLUORINE-CONTAINING RESIN LAMINATE

FIELD OF THE INVENTION

The present invention relates to a laminate having a high interfacial adhesion strength comprising a layer of a thermoplastic fluorine-containing resin (hereinafter referred to as "fluorocarbon resin" for brevity).

BACKGROUND OF THE INVENTION

In general, a fluorocarbon resin has excellent chemical resistance and has no water-absorption. Further, of various synthetic resins, the fluorocarbon resin has very excellent weatherability, thermal stability, abrasion resistance and non-tackiness.

Polytetrafluoroethylene (PTFE) is the representative polymer of fluorocarbon resin. PTFE is used as a corrosion resistant material for inner lining or packings in pipes of chemical apparatuses from the standpoints of a high thermal stability and an excellent chemical resistance; an insulating material for electric cables from the standpoints of a low dielectric constant and dielectric loss and a high resistivity; and a bearing or sliding material of non-oil supply from the standpoint of an excellent surface lubricating property.

However, since PTFE has a high melting point and is difficult to fuse, the moldability is poor and the molding must be conducted by sinter molding. Therefore, the moldability of PTFE has been improved by using a copolymer comprising tetrafluoroethylene and a fluorine-containing vinyl monomer other than the tetrafluoroethylene or olefin monomer, or a fluorine-containing resin which does not use tetrafluoroethylene, thereby obtaining a thermoplastic material having the characteristics of PTFE.

On the other hand, fluorocarbon resin has the above-described excellent characteristics but is expensive, and it is therefore considered that a laminate of the fluorocarbon resin and another inexpensive substrate is useful from a practical standpoint.

However, fluorocarbon resin is non-tacky and it is difficult to adhere it to another substrate.

Various methods have heretofore been proposed to improve the adhesion between fluorocarbon resin and another substrate. For example, a method comprising wet treating a surface of a fluorocarbon resin molding with an alkali metal solution and a method comprising a dry treating a surface of a fluorocarbon resin molding by means of a corrona discharge, plasma discharge, sputter etching, etc. are known as methods of improving the surface of the fluorocarbon resin so as to bond the fluorocarbon resin to another substrate with an adhesive. Other than these methods, a method comprising dissolving the surface of the fluorocarbon resin with a specific solvent to bond it to another substrate and a method comprising physically bonding the fluorocarbon resin to another substrate with a glass mat are known.

Further, adhesive resins which bond the fluorocarbon resin and another substrate have been proposed. For example, a specific ethylene-ethyl acrylate copolymer or ethylene-vinyl acetate copolymer or their modified products (Japanese Patent Published Unexamined Application Nos. 86748/81 and 12645/82), an epoxy group-containing polyolefin (Japanese Patent Published Unexamined Application Nos. 8155/82 and 212055/82), a resin composition of a methyl methacrylate copolymer onto which vinylidene fluoride is grafted and a methyl methacrylate polymer (Japanese Patent Published Unexamined Application No. 12646/82) and the like are known as such resins.

However, the above-described prior art is not satisfactory with respect to mold-processability or adhesion and there are restriction on the types of adherent. For example, a laminate of a thermoplastic fluorocarbon resin and an ethylene-vinyl acetate copolymer as disclosed in Japanese Patent Published Unexamined Application Nos. 86748/81 and 12645/82 has the disadvantage that when a large amount of vinyl acetate is introduced in the form of a copolymer with ethylene to improve the adhesion, the mechanical strength of the copolymer deteriorates and the adhesion strength is not improved.

SUMMARY OF THE INVENTION

As a result of investigations to overcome the disadvantages of the prior art, it is been found that use of a specific modified polymer remarkably improves the adhesion and the desired object can be achieved.

Accordingly, an object of the present invention is to provide a laminate comprising a layer of a modified resin (a) or (b) and a layer of a thermoplastic fluorine-containing resin:

(a) A resinous modified polymer or modified polymer composition thereof comprising a polymer selected from the group consisting of an ethylene polymer and a vinyl acetate polymer wherein vinyl acetate is graft-copolymerized onto at least a part of the polymer in an amount of at least 5% by weight based on the weight of the polymer or polymer composition and the total vinyl acetate content is 20 to 80% by weight based on the weight of the polymer or polymer composition;

(b) A resinous modified polymer or modified polymer composition thereof comprising a polymer selected from the group consisting of an ethylene polymer and an alkyl acrylate polymer, wherein an alkyl acrylate is graft-copolymerized onto at least a part of the polymer in an amount of at least 5% by weight based on the weight of the polymer or polymer composition and the total alkyl acrylate content is 20 to 80% by weight based on the weight of the polymer or polymer composition.

The laminate according to the present invention exhibits a high interfacial adhesion strength and possesses the advantages of the fluorocarbon resin and also the properties of another substrate, and hence, it is expected that the laminate will find substantial use for both industrial and daily necessities.

DETAILED DESCRIPTION OF THE INVENTION

The ethylene polymer used in the present invention is an ethylene homopolymer, a copolymer of at least 50% by weight of ethylene and α-olefin having, for example, 3 to 12 carbon atoms (e.g., propylene, butene-1, hexene-1, heptene-1 or 4-methylpentene-1), a vinyl ester (e.g., vinyl acetate), an unsaturated carboxylic acid or derivatives thereof (e.g., acrylic acid, methyl acrylate, ethyl acrylate, methyl methacrylate, maleic acid, itaconic acid or maleic anhydride), or an oxidized, chlorinated or saponified product of those polymers. The copolymer used therein includes any random, block and graft copolymers.

Representative examples of the ethylene polymer include a low, medium or high density polyethylene, an ethylene-propylene copolymer, an ethylene-butene copolymer, an ethylene-vinyl acetate copolymer, an ethylene-acrylic acid copolymer, an ethylene-alkyl acrylate copolymer and a maleic anhydride grafted ethylene polymer.

An ethylene polymer having a crystallinity of 50% or less is preferred.

Of the above ethylene polymers, for the modified polymer (a), ethylene-vinyl acetate copolymer is preferred and ethylene-vinyl acetate copolymer containing at least 15% by weight of vinyl acetate is particularly preferred. For the modified polymer (b), ethylene-alkyl acrylate copolymer is preferred and ethylene-alkyl acrylate containing at least 15% by weight of alkyl acrylate is particularly preferred.

The vinyl acetate polymer used in the present invention is a vinyl acetate homopolymer or a copolymer of at least 50% by weight of vinyl acetate and an olefin such as ethylene or propylene. A polyvinyl acetate and a vinyl acetate-ethylene copolymer are preferred.

The alkyl acrylate polymer used in the present invention is an alkyl acrylate homopolymer or a copolymer of at least 50% by weight of alkyl acrylate and an olefin such as ethylene or propylene. Polyalkyl acrylate and alkyl acrylate-ethylene copolymer are preferred.

Examples of the alkyl acrylate include methyl, ethyl, propyl or butyl ester of acrylic acid or methacrylic acid. From the standpoint of adhesion, methyl or ethyl ester is preferred.

The ethylene polymers, vinyl acetate polymers and alkyl acrylate polymers can contain various additives, inorganic fillers, colarant, etc. which are conventionally used in resins.

The modified polymer or modified polymer composition which constitutes one layer of the laminate of the present invention is (a) a modified resin of a polymer or modified polymer composition thereof comprising a polymer selected from the group consisting of the ethylene polymer and vinyl acetate polymer, wherein vinyl acetate is graft-copolymerized onto at least a part of the polymer or polymer composition in an amount of at least 5% by weight based on the weight of the polymer or polymer composition and the total vinyl acetate content is 20 to 80% by weight, preferably 25 to 65% by weight, based on the weight of the polymer or polymer composition; or (b) a modified resin of a polymer or modified polymer composition thereof comprising a polymer selected from the group consisting of the ethylene polymer and alkyl acrylate polymer, wherein alkyl acrylate is graft-copolymerized onto at least a part of the polymer or polymer composition in an amount of at least 5% by weight based on the weight of the polymer or polymer composition and the total alkyl acrylate content is 20 to 80% by weight, preferably 25 to 65% by weight, based on the weight of the polymer or polymer composition.

The vinyl acetate or alkyl acrylate which is the modifier can be graft-copolymerized with the coexistence of other vinyl comonomers.

The modified resin can contain other polymers, inorganic fillers, stabilizers, colorant, etc. so long as those materials do not disturb the effect of the present invention.

The representative embodiment is (a) a product obtained by grafting an appropriate amount of vinyl acetate onto at least one polymer selected from the group consisting of ethylene polymer and vinyl acetate polymer or a product obtained by diluting the grafted product with the same or different kind of ungrafted ethylene polymer or vinyl acetate polymer; or (b) a product obtained by grafting an appropriate amount of alkyl acrylate onto at least one polymer selected from the group consisting of ethylene polymer and alkyl acrylate polymer or a product obtained by diluting the grafted product with the same or different kind of ethylene polymer or alkyl acrylate polymer.

The grafting method which can be used in the present invention can be any of: solution grafting, molten grafting, aqueous suspension grafting, radiation grafting, etc. From the standpoints of a uniform dispersion of the vinyl acetate or alkyl acrylate and inhibition of gelatin, aqueous suspension grafting as described in U.S. Pat. No. 4,097,554 is preferred. The grafting methods can be conducted by the conventional methods.

If the amount of the vinyl acetate or alkyl acrylate grafted is less than 5% by weight, the initial and desired object cannot be achieved with a balance between adhesion and strength.

If the total vinyl acetate or alkyl acrylate content is less than 20% by weight, the adhesion is insufficient and if the total content is more than 80% by weight, the moldability deteriorates.

The layer of the resin can contain a petroleum resin or a tackifier which is conventionally used in a hot-melt adhesive.

The fluorocarbon resins which can be used in the present invention are commercially available products and the examples thereof include polyvinyl fluoride, polyvinylidene fluoride, polychlorotrifluoroethylene, ethylenetetrafluoroethylene copolymer, ethylene-chlorotrifluoroethylene copolymer, tetrafluoroethylene-hexafluoropropylene copolymer, tetrafluoroethylene-perfluoroalkylvinyl ether copolymer, etc.

Of those resins, polyvinyl fluoride and polyvinylidene fluoride are preferred.

Other polymers which are compatible with the fluorocarbon resin can be blended with the fluorocarbon resin.

An example of such a blend is a composition of polyvinylidene fluoride and polymethyl methacrylate. Of course, various inorganic fillers, pigments, etc. which are conventionally used can be added to the blend.

The process for producing a laminate of the present invention involves laminating the layers of resins by coextrusion molding, compression molding, extrusion coating, etc.

The laminate of the present invention includes not only two layers but also three layers or more (basic two layer and additional layers).

Examples of the materials for such additional layer(s) include halogen-containing resin such as polyvinyl chloride or polyvinylidene chloride; styrene resin such as acrylonitrile-butadiene-styrene resin or polystyrene; polyolefin resin such as polyethylene or polypropylene; rubber such as acrylonitrile-butadiene rubber or styrene-butadiene rubber; metal such as aluminum or iron; thermosetting resin such as unsaturated polyester, epoxy resin or urethane resin; engineering resin such as thermoplastic polyester, polycarbonate or nylon; etc.

The modified resin which constitutes one layer of the laminate of the present invention can be laminated with the substrate without an adhesive. The resin can, of course, be bonded to the substrate with an adhesive.

In laminating with the adherent, it is preferred from the standpoint of adhesion that the modified resin used in the present invention be a resin containing, in addition to the vinyl acetate or alkyl acrylate, an additional unsaturated monomer such as unsaturated carboxylic acid or anhydride thereof, or unsaturated glycidyl monomer in the form of a graft modification or copolymerization, or a saponified product in which a part of vinyl acetate in the ethylene polymer or vinyl acetate polymer which constitutes the modified resin is hydrolyzed.

The method of obtaining "a resin containing... in the form of graft modification or copolymerization" means a method of grafting the additional unsaturated monomer simultaneously when graft-copolymerizing the vinyl acetate or alkyl acrylate; using as a polymer to be modified, a material which already contains the additional unsaturated monomer in the form of graft or copolymerization; graft-copolymerizing the additional unsaturated monomer with the modified resin containing the predetermined amount of the vinyl acetate or alkyl acrylate; or blending a material containing the unsaturated monomer in the form of graft or copolymerization with the polymer to be modified or the same type of olefin polymer.

Examples of the unsaturated carboxylic acid or anhydride thereof include acrylic acid, methacrylic acid, maleic acid, fumaric acid, itaconic acid and the anhydrides of those acids. Maleic anhydride is particularly preferred.

Examples of the unsaturated glycidyl monomer include glycidyl methacrylate and glycidyl acrylate.

The laminate of the present invention can be obtained at the time of molding the fluorocarbon resin and therefore is particularly useful as the inner surface lining of pipes such as metal pipe and coextruded film or containers which have been difficult to laminate.

The present invention will now be explained in greater detail by reference to the following Examples. The evaluations therein are according to the following methods.

(1) MFR: According to JIS-K-6730
(2) Adhesion: A laminate is cut into a long strip having a width of 1 cm. After a part of the strip is peeled off, a fluorocarbon resin and a substrate are put between chucks of an Instron-type tester to measure the adhesion strength at a rate of 50 mm/min.
(3) Vinyl acetate content: According to JIS-K-6730
(4) Alkyl acrylate content: A modified resin obtained is vacuum dried at 60° C. for 10 hours and then subjected to an infrared spectroscopy.

REFERENTIAL EXAMPLE 1

A 50 liter autoclave was charged with 20 kg of purified water, 0.6 kg of tribasic calcium phosphate as a suspending agent and 0.6 g of sodium dodecylbenzenesulfonate to prepare an aqueous medium. Seven kg of an ethylene-vinyl acetate copolymer (MFR: 30 g/10 min, vinyl acetate content: 33% by weight) having a particle diameter of 3 to 4 mm was added to the medium and the resulting mixture was stirred to suspend.

Separately, 30 g of t-butyl peroxypivalate and 6.75 g of benzoyl peroxide were dissolved in 3 kg of vinyl acetate. The resulting solution was added to the suspension prepared above.

The atmosphere of the system was replaced by introducing air into the autoclave and a pressure of 0.5 kg/cm$^2$G was applied thereto. The temperature in the autoclave was elevated to 50° C. and the system was allowed to stand at this temperature while stirring to impregnate vinyl acetate containing the polymerization initiator into the ethylene-vinyl acetate particles.

The temperature of the resulting suspension was elevated to 60° C. and the suspension was allowed to stand at this temperature for 5 hours while stirring to conduct polymerization. The temperature was further elevated to 90° C. and the system was maintained for 5 hours to complete the polymerization.

After cooling, the contents were taken out and washed with water to obtain 10 kg of vinyl acetate-modified ethylene-vinyl acetate copolymer particles. The vinyl acetate content in the modified ethylene-vinyl acetate copolymer obtained was 53% by weight.

EXAMPLE 1

The vinyl acetate-modified ethylene-vinyl acetate copolymer obtained in Referential Example 1 above and a polyvinylidene fluoride ("Kynar #460", a product of Pennwalt Co.) each was subjected to a compression molding at 200° C. to obtain a sheet having a thickness of 0.5 mm, respectively.

Those sheets were laminated by compression molding at 200° C. to obtain a laminate sheet of the modified ethylene-vinyl acetate copolymer and polyvinylidene fluoride.

The interfacial adhesion strength of the laminate obtained was 2,800 g/cm.

COMPARATIVE EXAMPLE 1

Laminates were prepared in the same manner as in Example 1 except for using ethylene-vinyl acetate copolymers shown in Table 1 below.

The interfacial adhesion strength in each laminate are also shown in Table 1 below.

TABLE 1

| Ethylene-Vinyl Acetate Copolymer | | |
|---|---|---|
| MFR (g/10 min) | Vinyl Acetate Content (wt %) | Interfacial Adhesion Strength (g/cm) |
| 12 | 20 | 30 |
| 30 | 33 | 450 |
| 2 | 45 | 540 |

EXAMPLE 2

A modified ethylene-vinyl acetate copolymer was obtained in the same manner as in Referential Example 1 except that 2-ethylhexyl acrylate was introduced as a comonomer.

The vinyl acetate content in the modified ethylene-vinyl acetate copolymer obtained was 44% by weight and the 2-ethylhexyl acrylate content therein was 9% by weight.

Using this modified ethylene-vinyl acetate copolymer and the polyvinylidene fluoride as used in Example 1, a laminate was prepared in the same manner as in Example 1.

The interfacial adhesion strength in the laminate obtained was 3,000 g/cm.

EXAMPLE 3

0.1 mm thick sheet of the modified ethylene-vinyl acetate copolymer and 0.5 mm thick sheet of the polyvinylene fluoride which were used in Example 1 were molded by compression molding together with a 0.5 mm thick substrate as shown in Table 2 below under the conditions as shown in Table 2 below to obtain a laminate.

The interfacial adhesion strength in each laminate is shown in Table 2 below.

TABLE 2

| Substrate | Adehsion Temperature (°C.) | Adhesion Strength (g/cm) Between PVDF and Modified EVA | Between substrate and Modified EVA |
|---|---|---|---|
| Polyethylene | 200 | 2,000 | non-separable |
| Polypropylene | 200 | 2,300 | " |
| Thermoplastic elastomer* | 200 | 3,000 | " |
| Polyvinyl chloride | 160 | 2,700 | " |

*"Thermorun #3600", a product of Mitsubishi Petrochemical Co.

EXAMPLE 4

The modified ethylene-vinyl acetate copolymer as used in Example 1 and a maleic anhydride-modified ethylene-vinyl acetate copolymer (MFR: 4 g/10 min, vinyl acetate content: 20% by weight, maleic anhydride content: 0.6% by weight) were blended in the proportions of 80% by weight and 20% by weight, respectively and passed through an extruder at 160° C. to obtain a blend.

A 0.1 mm thick sheet of the blend obtained, 0.5 mm thick sheet of the polyvinylidene fluoride as used in Example 1 and a substrate as shown in Table 3 below were molded by a compression molding under the conditions as shown in Table 3 below to obtain a laminate.

The interfacial adhesion strength in each laminate obtained is shown in Table 3 below.

TABLE 3

| Substrate* | Adhesion Temperature (°C.) | Adhesion Strength (g/cm) Between PVDF and blend | Between substrate and blend |
|---|---|---|---|
| Aluminum plate | 200 | 2,900 | non-separable |
| Copper plate | 200 | 2,500 | " |

*0.2 mm thick

REFERENTIAL EXAMPLE 2

A 50 liter autoclave was charged with 20 kg of purified water, 0.6 kg of tribasic calcium phosphate and 0.6 g of sodium dodecylbenzenesulfonate to prepare an aqueous medium. 7 kg of an ethylene-ethyl acrylate copolymer (MFR: 20 g/10 min, ethyl acrylate content: 18% by weight) having a particle diameter of 3 to 4 mm was added to the medium, followed by stirring to suspend.

Separately, 30 g of t-butyl peroxy(2-ethyl hexanoate) was dissolved in 3 kg of ethyl acrylate. The resulting solution was added to the suspension system prepared above.

The atmosphere of the system was replaced by introducing nitrogen into the autoclave. The temperature in the autoclave was elevated to 60° C. and the system was allowed to stand at this temperature for 5 hours while stirring to impregnate ethyl acrylate containing the polymerization initiator into ethylene-ethyl acrylate copolymer particles.

The temperature of the resulting suspension was elevated to 80° C. and the suspension was allowed to stand at this temperature for 5 hours while stirring to conduct polymerization. The temperature was further elevated to 90° C. and the system was maintained for 3 hours to complete the polymerization.

After cooling, the contents were taken off and washed with water to obtain 10 kg of ethyl acrylate-modified ethylene-ethyl acrylate copolymer particles. The ethyl acrylate content in the modified ethylene-ethyl acrylate copolymer obtained was 43% by weight.

EXAMPLE 5

Using the ethyl acrylate-modified ethylene-ethyl acrylate copolymer obtained in Referential Example 2 above and the polyvinylidene fluoride as used in Example 1, a 0.5 mm thick sheet was molded in the same manner as in Example 1.

Using the sheet thus obtained, a laminate was obtained in the same manner as in Example 1.

The interfacial adhesion strength of the laminate obtained was 1,120 g/cm.

COMPARATIVE EXAMPLE 2

Using an ethylene-ethyl acrylate copolymer as shown in Table 4 below and the polyvinylidene fluoride as used in Example 1, a laminate was prepared in the same manner as in Example 1.

The interfacial adhesion strength of each laminate is shown in Table 4 below.

TABLE 4

| Ethylene-Ethyl Acrylate Copolymer | | |
|---|---|---|
| MFR (g/10 min) | Ethyl Acrylate Content (wt %) | Adhesion Strength (g/cm) |
| 1.5 | 15 | 20 |
| 20 | 18 | 120 |

EXAMPLE 6

Using the modified ethylene-ethyl acrylate copolymer as used in Example 5 and a polyvinylidene fluoride/acrylic alloy ("Kynar #1120", a product of Pennwalt Co.), a laminate was prepared in the same manner as in Example 1.

Interfacial adhesion strength of the laminate obtained was 1,060 g/cm.

EXAMPLE 7

The modified ethylene-ethyl acrylate copolymer used in Example 5 and a maleic anhydride-modified ethylene-ethyl acrylate copolymer (MFR: 6 g/10 min, ethyl acrylate content: 18% by weight, maleic anhydride content: 0.6% by weight) were blended in the proportions of 80% of weight and 20% by weight, respectively, and were passed through an extruder at 160° C. to obtain a blend.

0.1 mm thick sheet of the resulting blend, 0.5 mm thick sheet of the polyvinylidene fluoride as used in Example 1 and 0.2 mm thick aluminum plate as a substrate were molded by a compression molding under the conditions shown in Table 5 below to obtain a laminate.

The interfacial adhesion strength in the laminate is shown in Table 5 below.

TABLE 5

| Substrate | Adhesion Temperature (°C.) | Adhesion Strength (g/cm) | |
|---|---|---|---|
| | | Between PVDF and blend | Between substrate and blend |
| Aluminum plate | 200 | 1,200 | non-separable |

While the invention has been described in detail and with reference to specific embodiments thereof, it will be apparent to one skilled in the art that various changes and modifications can be made therein without departing from the spirit and scope thereof.

What is claimed is:

1. A laminate comprising a layer of the following modified resin(a) or (b) and a layer of a thermoplastic fluorine-containing resin, wherein:
   (a) is a resinous modified copolymer comprising an ethylene-vinyl acetate copolymer having vinyl acetate graft-copolymerized onto at least a part of the copolymer in an amount of at least 5 percent by weight based on the modified copolymer, wherein the total vinyl acetate content is 20 to 80 percent by weight based on the weight of the modified copolymer;
   (b) is a resinous modified copolymer comprising a copolymer selected from the group consisting of ethylene-lower alkyl acrylate copolymer, ethylene-lower alkyl methacrylate copolymer and the combination thereof, said copolymer having lower alkyl acrylate, lower alkyl methacrylate or a combination thereof graft-copolymerized onto at least a part of said copolymer in an amount of at least 5 percent by weight based on the weight of the modified copolymer, wherein the total lower alkyl acrylate and lower alkyl methacrylate content is 20 to 80 percent by weight based on the weight of the modified copolymer.

2. The laminate as claimed in claim 1, wherein the polymer is an ethylene-vinyl acetate copolymer which contains at least 15% by weight of vinyl acetate.

3. The laminate as claimed in claim 1 wherein the copolymer is selected from the group consisting of ethylene-lower alkyl acrylate copolymer, ethylene-lower alkyl methacrylate copolymer or the combination thereof, wherein the copolymer contains at least 15% by weight of lower alkyl acrylate, lower alkyl methacrylate or a combination thereof.

4. The laminate as claimed in claim 1, wherein the total vinyl acetate content in modified copolymer (a) is 25 to 65% by weight based on the weight of modified copolymer (a).

5. The laminate as claimed in claim 1, wherein the total lower alkyl acrylate and lower alkyl methacrylate content in modified copolymer (b) is 25 to 65% by weight based on the weight of modified copolymer (b).

6. The laminate as claimed in claim 1 wherein the lower alkyl acrylate and lower alkyl methacrylate are the methyl or ethyl esters of acrylic acid and methacrylic acid respectively.

7. The laminate as claimed in claim 1, wherein the modified copolymer (a) is further diluted with ethylene polymer or vinyl acetate polymer.

8. The laminate as claimed in claim 1, wherein the modified resin (b) is further diluted with ethylene polymer or lower alkyl acrylate or lower alkyl methacrylate polymer.

9. The laminate as claimed in claim 1, wherein the graft copolymerization is carved out by aqueous suspension grafting.

10. The laminate as claimed in claim 1, wherein the fluorine-containing resin is selected from the group consisting of polyvinyl fluoride and polyvinylidene fluoride.

* * * * *

UNITED STATES PATENT AND TRADEMARK OFFICE
CERTIFICATE OF CORRECTION

PATENT NO. : 4,588,642
DATED : May 13, 1986
INVENTOR(S) : Masahide Ochiumi

It is certified that error appears in the above-identified patent and that said Letters Patent is hereby corrected as shown below:

In the Heading of the Patent, Item [75], after the first

Inventor is listed, please insert:

Shinji Horie, Yokkaichi, Japan

Signed and Sealed this

Twenty-fifth Day of November, 1986

*Attest:*

DONALD J. QUIGG

*Attesting Officer*    *Commissioner of Patents and Trademarks*